(No Model.)
T. REESE, Jr.
STAY BOLT HOLE DRILLING AND TAPPING MACHINE.
No. 386,032. Patented July 10, 1888.
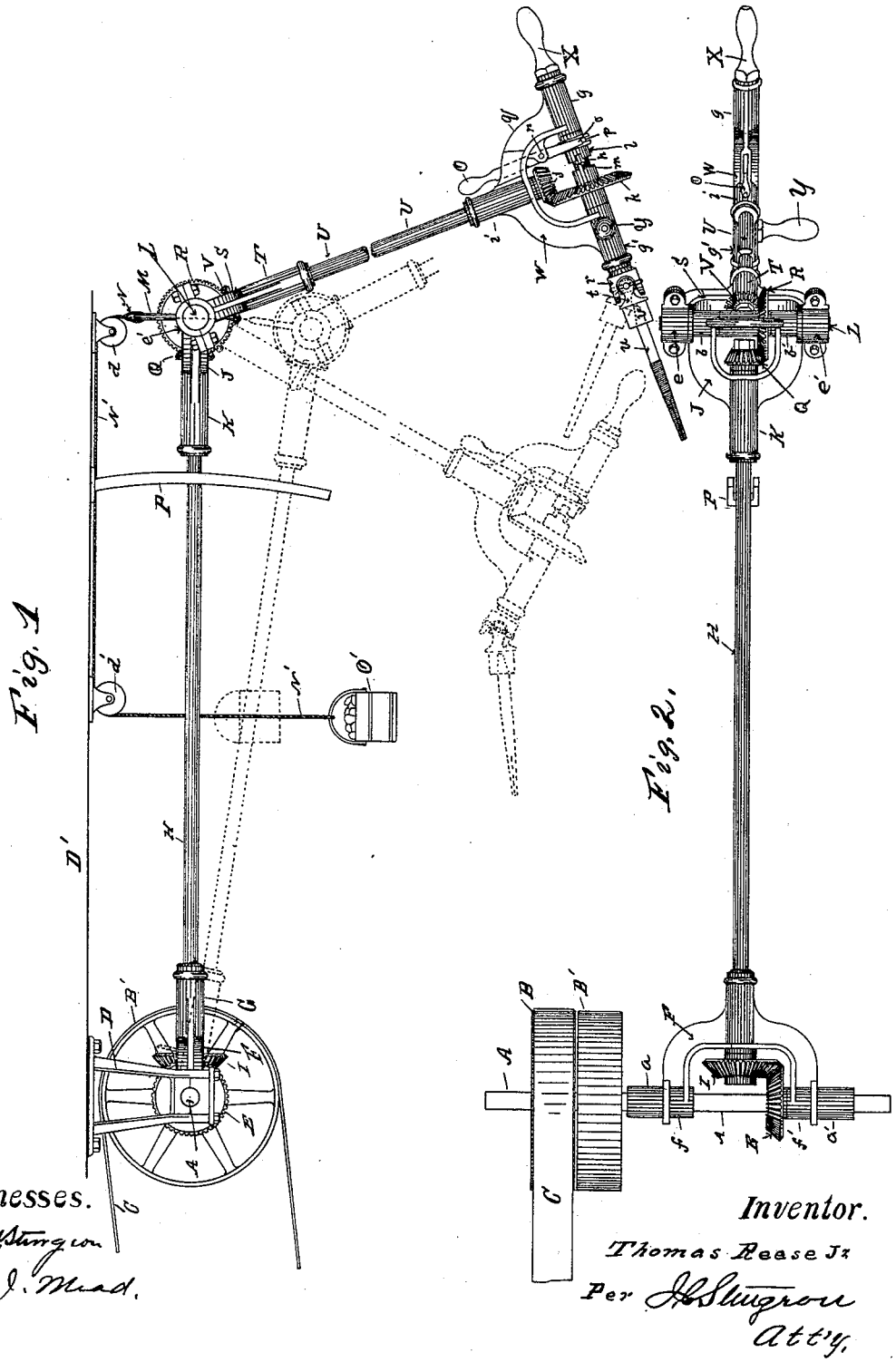
Witnesses.
H. M. Sturgeon
G. J. Mead.
Inventor.
Thomas Reese Jr
Per H. Sturgeon
Att'y.

United States Patent Office.

THOMAS REESE, JR., OF ERIE, PENNSYLVANIA.

STAY-BOLT-HOLE DRILLING AND TAPPING MACHINE.

SPECIFICATION forming part of Letters Patent No. 386,032, dated July 10, 1888.

Application filed May 2, 1888. Serial No. 272,613. (No model.)

*To all whom it may concern:*

Be it known that I, THOMAS REESE, Jr., a citizen of the United States, residing at Erie, in the county of Erie and State of Pennsylvania, have invented certain new and useful Improvements in Stay-Bolt-Hole Drilling and Tapping Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in stay-bolt-hole drilling and tapping machines, hereinafter set forth and explained, and illustrated in the accompanying drawings, in which—

Figure 1 is a side elevation of my improved stay-bolt-hole drilling and tapping machine. Fig. 2 is a plan view of same.

Like letters refer to like parts in all the figures.

In the construction of my improved stay-bolt-hole drilling and tapping machine, A is the stationary driving-shaft having ordinary tight and loose pulleys, B B', thereon, on which a motor-belt, C, operates. This shaft A, I mount in suitable hangers, D, secured to an overhead support, D'. On the shaft A, between the hangers D, I secure a miter or bevel gear-wheel, E. I also mount on said shaft A a yoke, F, having sleeves $f f'$ thereon adapted to operate as the bearings thereof on the shaft A, this yoke being retained in position laterally by collars $a\ a'$, secured to the shaft A, so that the yoke F will swing vertically on the shaft A between the collars $a\ a'$. In the central part of the yoke F, I make a sleeve, G, extending through the yoke F toward the shaft A, which sleeve G forms the bearing in which one end of a shaft, H, is journaled. On the inside of the yoke F, I secure to the end of the shaft H a miter or bevel gear-wheel, I, adapted to intermesh with and be driven by the gear-wheel E on the shaft A in whatever position the shaft H may occupy radially to the shaft A. On the opposite end of the shaft H, I mount a yoke, J, which is provided with a sleeve, K, the ends of the yoke J being provided with sleeves $b\ b'$, within which a transverse shaft, L, rotates, the sleeve J being radial thereto.

On the upper side of the sleeves $b\ b'$, I secure a semicircular yoke, M, adapted to receive a sliding ring or hook, N, on the end of a supporting rope or chain, N', this rope or chain psssing over pulleys $d\ d'$, secured to the overhead support, D', the opposite end of the rope or chain N' being provided with a weight, O', adapted to counterbalance the weight of the shaft H and the yoke J, and the mechanism secured thereto, as hereinafter described, the ring or hook N operating in the yoke M, so that the yoke J and the mechanism supported thereon can be conveniently oscillated laterally within an arc of ninety degrees or more. I also secure to the overhead support, D', a downwardly-projecting forked guide, P, adapted to steady the shaft H laterally, but permitting the free vertical movement of the free end thereof and the mechanism mounted thereon.

On the end of the shaft H, within the yoke J, I secure a miter or bevel gear, Q, adapted to intermesh with and drive a miter or bevel gear, R, mounted on the shaft L. On the outer ends of the shaft L, I mount another yoke, S, having bearings $e\ e'$ on the ends thereof, within which the shaft L can rotate, and centrally within the yoke S, I make a sleeve, T, radial to the shaft L, within which sleeve T is journaled the upper end of a shaft, U, having on the end thereof, within the yoke S, a miter or bevel gear, V, adapted to intermesh with and be driven by the gear-wheel R on the shaft L. On the opposite or lower end of the shaft U, I mount another yoke, W, this yoke W having bearings $g\ g'$ on the ends thereof, within which bearings is journaled a transverse shaft, $h$, the bearing of the yoke W upon the shaft U being a sleeve, $i$, radial to the shaft $h$, within which sleeve the lower end of the shaft U is journaled.

On the lower end of the shaft U, within the yoke W, I also secure a bevel or miter gear, $j$, which intermeshes with and drives a bevel or miter gear-wheel, $k$, mounted loosely on the shaft $h$. On the shaft $h$, I also mount a sliding clutch-ring, $l$, secured from rotating on the shaft $h$ by an ordinary spline and groove, (not shown,) this clutch-ring $l$ being adapted to engage with projections $m$ on the hub of the gear-wheel $k$ and communicate the motion of said wheel to the shaft $h$. For operating the clutch-ring $l$, I pivot a small lever, O, to ears $n$, on one side of the yoke W, the lower end, o, of said lever being forked, so as to engage with grooves p in the clutch-ring l, so that the operator can move the clutch-ring l in or out of engagement with the lugs m on the hub of the wheel k at pleasure. On the outer end of the sleeve g of the yoke W, I secure a longitudinal handle, X, and on the sleeve g' thereof I secure a laterally-projecting handle, Y, by means whereof the operator can move and adjust the yoke W and the mechanism mounted thereon in any position desired, and retain the same in such position while the mechanism is being operated.

One end of the shaft h projects through the sleeve g' of the yoke W, and has secured thereto a knuckle-joint, r t, by means whereof the drill or tap u, inserted in the socket v, secured to the part t of the knuckle-joint r t, is adapted to be operated by the shaft h, within a radius, say, of forty-five degrees (more or less) from the direct line of the shaft h.

In operation the shaft A operates through the gears E and I to rotate the shaft H, which in turn, through the gear Q, intermeshing with the gear R on the shaft L operates to rotate the shaft U by means of the gear V on the shaft U, and this shaft U, by means of the gear j thereon, operates to rotate the loose wheel k on the shaft h.

It is obvious that the several parts will operate as described at whatever angles the several shafts may be moved in relation to each other within the proper limitations of such movements, the dotted lines in Fig. 1 illustrating some of the positions in which the mechanism may be operatively used. The shaft U and the mechanism secured to the yoke W on the lower end of said shaft can also be oscillated laterally (the sleeve K turning on the shaft H) within an arc of ninety degrees or more in actual operation, the movement in that direction being only limited by the operation of the supporting ring or hook N in the yoke M.

The yoke W can also be turned upon the shaft U so as to drill or tap in any direction radially to the line of the shaft U, as desired. The operation of the clutch, drill, and tap mechanism mounted on the yoke W is so obvious that further description thereof is unnecessary.

Therefore, what I claim as new, and desire to secure by Letters Patent of the United States, is—

1. The combination, in a stay-bolt-hole drilling and tapping machine, of a shaft, H, swinging radially from and driven by a stationary shaft, and counterbalancing pulleys and weights for supporting the free end of said shaft, with a transverse shaft, L, journaled in a yoke, J, mounted on and adapted to be rotated around the free end of said swinging shaft H, a second swinging shaft, U, mounted in a yoke, S, swinging on said transverse shaft and gearing operatively connecting said shafts H L U together, whereby said second swinging shaft can be rotated radially around the first swinging shaft and also swung to and fro, as required, substantially as and for the purpose set forth.

2. The combination, in a stay-bolt-hole drilling and tapping machine, of a shaft swung from a counterbalanced overhead support, with a yoke mounted on the lower end of said swinging shaft and adapted to rotate about the axis of said shaft, and a cross-shaft mounted in bearings on said yoke, substantially as and for the purpose set forth.

3. The combination, in a stay-bolt-hole drilling and tapping machine, of a shaft, H, journaled in a yoke swinging radially upon a stationary driving-shaft and driven by miter or bevel gears on said shafts, and counterbalance-weights adapted to support the free end of said swinging shaft H and the mechanism connected therewith, with a transverse shaft, L, journaled in a yoke mounted on the free end of said swinging shaft and supporting a second yoke, S, having a shaft, U, journaled therein and swinging radially thereon, bevel or miter gears connecting said swinging and cross shafts, and a yoke, W, mounted on the free end of said second swinging shaft having a shaft, h, mounted therein transversely to said swinging shaft U, and bevel or miter gears connecting the same to said second swinging shaft, substantially as and for the purpose set forth.

4. The combination, in a stay-bolt-hole drilling and tapping machine, of a shaft, H, swinging radially from a stationary driving-shaft, A, and counterbalance mechanism N N' d d' O, with a yoke, J, mounted on the free end of the shaft H, a transverse shaft, L, mounted in said yoke, a yoke, S, mounted on the shaft L, a shaft, U, journaled in said yoke S radially to the shaft L, and gears Q R V, substantially as and for the purpose set forth.

5. The combination, in a stay-bolt-hole drilling and tapping machine, of a shaft, U, swung in a yoke, S, radially to a shaft, L, mounted in a yoke, J, transversely to a swinging shaft, H, with a yoke, W, mounted on the free end of the shaft U, a cross-shaft, h, loose gear-wheel k, and clutch mechanism i O, and gear j, intermeshing with the gear k, substantially as and for the purpose set forth.

6. The combination, in a stay-bolt-hole drilling and tapping machine, of a yoke, W, mounted on and adapted to rotate about the free end of a swinging shaft, U, a transverse shaft, h, mounted in said yoke W, a gear-wheel, k, on said shaft h, adapted to intermesh with and be driven by a gear, j, on the shaft U, clutch mechanism i O for engaging the wheel k with shaft h, and a knuckle-joint, t r, on the end of the shaft h, substantially as and for the purpose set forth.

In testimony whereof I affix my signature in presence of two witnesses.

THOMAS REESE, JR.

Witnesses:
WM. P. HAYES,
FRANK S. MATTES.